2 Claims. (Cl. 99—1)

3,208,851
PROCESS FOR PREPARING A BREADED DEEP-FRIED FOOD

Jack A. Antinori, Bayside, N.Y., and Morton W. Rutenberg, North Plainfield, N.J., assignors to National Starch and Chemical Corporation, New York, N.Y., a corporation of Delaware
No Drawing. Filed Feb. 14, 1963, Ser. No. 258,634
2 Claims. (Cl. 99—1)

This invention relates to improved batter mix compositions which are applied as coatings during the preparation of breaded, deep-fried foods, to a method for making such batter mix compositions, and to the foods coated therewith.

It is an object of this invention to provide a deep-fried batter mix material whose use results in a fried batter coating displaying a degree of adhesion and cohesion which is far superior to that attainable with presently employed batter mixes. Another object of this invention is to provide a novel method of preparing batter mix compositions. Other objects and the advantages of this invention will be apparent from the discussion that appears hereinafter.

As is known in the art, deep-fried food batters, whether for use with fresh or frozen foods, ordinarily consist of various types of unconverted starches and/or flour along with such other optional ingredients as egg solids, corn meal, baking powder, cream of tartar, preservatives, seasonings, coloring matter and milk solids. These mixtures are then combined with water so as to obtain the desired coating viscosity whereupon they are applied to the food by means of a dip, spray or cascade technique. The batter coated food is then coated with a breading such as corn meal, cracker crumbs, bread crumbs or the like.

After the excess breading is shaken free, the breaded foodstuff is then deep-fried by being immersed in a hot cooking oil such as corn oil, peanut oil or any other commonly employed food oil selected by the practitioner. Foods thus prepared may be immediately consumed or they may be packaged and quick frozen so that the ultimate consumer may prepare the foodstuff merely by reheating. In some cases, the food may not be cooked or it may receive only a partial cooking or "pre-frying" at this point, whereupon it is packaged and quick frozen with the frying of the uncooked or "pre-fried," frozen foodstuff then being completed by the ultimate consumer.

It has long been noted that most breaded batters, when prepared with the aforedescribed ingredients, display a relative lack of adhesion to their respective foodstuffs which is evidenced by their pronounced tendency to pull away from the foodstuff subsequent to the breading and deep-freezing operations. The breaded batter actually forms a skin or coating having so little adhesion to the foodstuff that it may be literally stripped away from the surface of the foodstuff. This lack of adhesion is particularly evident when the foodstuff being coated is of the quick frozen type and thus results in a certain loss of protection to these products since air is now able to enter the space between the food and its loosened, deep-fried, breaded batter coating. In addition to this lack of adhesion, these deep-fried, breaded batter coatings display very poor cohesion which, in turn, results in their poor film strength as evidenced by the ready crumbling and disintegration of the breaded batter coating when it is handled or eaten. This lack of cohesion on the part of the breaded foodstuff detracts from its overall appeal to the consumer.

As is known to those skilled in the art, amylaceous materials, such as starches, may be dissolved or dispersed in a solvent, usually water, and treated with an oxidizing agent to provide starch products having modified chemical and physical properties. Although such oxidized starch products produced by aqueous oxidation techniques have been used to prepare batter mixes for breaded, deep-fried foods, it has been found that these mixes still exhibit all of the detrimental characteristics, heretofore described, of the other mixes previously employed for this purpose.

We have found surprisingly, that the use in batter mixes of amylaceous materials which have been subjected to a novel, dry oxidation process provides an improved deep-fried food batter which is entirely free from the undesirable properties associated with the heretofore employed mixes.

The amylaceous materials applicable to the process of our invention may be derived from cereal and tuber starches as well as derivatives of the latter including esterified, etherified and thin boiling starches still retaining amylaceous material. The amylaceous materials may be derived from such sources as corn, high-amylose corn, sago, wheat, rice, potato, sweet potato, waxy maize, tapioca, sorghum, or waxy sorghum starches, as well as from components of these starches, viz., amylose and amylopectin. It should also be noted that cereal flour containing amylaceous materials, i.e. starches, are also applicable in our process. These flours may be derived from such sources as wheat, corn, or potatoes. It may be noted that, for the purposes of our invention, these amylaceous materials may contain from about 2% to about 22%, by weight, of moisture.

The use of amylaceous materials oxidized in a dry process provides a batter mix for breaded, deep-fried foods which is vastly superior in all respects to batter mixes prepared from ordinary starches or flours. Thus, the batter mix compositions of our invention display a degree of adhesion to deep-fried foods which is so tenacious as to actually render the breaded batter coating into an integral component of the foodstuff. This adhesion is, in fact, so complete that it is virtually impossible to remove the deep-fried, breaded batter from the foodstuff without actually pulling off a portion of the foodstuff along with the breaded batter. Moreover, the batter mix of our invention possesses a highly cohesive film strength which is resistant to the high temperatures of the deep-frying operation. This unusual cohesiveness on the part of the breaded batters prepared with our oxidized starch batter mixes, allows these deep-fried foodstuffs to retain their breaded batter mix coatings as a continuous entity which is completely free from any undesirable crumbling or disintegration.

The cohesive, continuous nature of these breaded coatings traps and maintains the moisture content of the foodstuff during the deep-frying operations resulting in a final product which is desirably moist, tender and fresh tasting. In contrast, ordinary starch and flour batters, as well as those prepared with starches oxidized in an aqueous medium, are low in cohesive strength and are thus degraded by the heat of the deep-frying operation so that the moisture content of the foodstuff is lost while, at the same time, the lack of adhesion between the batter and the foodstuff is also contributing to the moisture loss.

In preparing the novel batter mixes of our invention, an amylaceous material, and particularly starch, is exposed to a stream of an oxidizing gas. Among the oxidizing gases that have proved most effective in preparing the products of our invention are included ozone, chlorine, chlorine dioxide, nitrosyl chloride, nitrogen dioxide, and similar compounds.

The amount of oxidizing gas employed in our procedure will vary, of course, with the particular gas used and with the type of amylaceous material treated. Thus, for example, we have found that, as based on the weight of the material being oxidized, ozone may be used in amounts ranging from about .025% to 10%, whereas gases such as chlorine, chlorine dioxide, nitrosyl chloride, and nitrogen dioxide may be used in amounts varying from about .04% to 5%. It should be understood that the upper concentration limits set forth hereinabove are not critical to our invention and are merely presented as a guide to the practitioner. Moreover, we have found that concentrations of oxidizing gas greater than these maximum limits may be used with similar results being obtained. However, use of oxidizing gases in amounts greater than the specified limits will not effect appreciable changes in the desirable properties of the products thereby produced.

In preparing the novel batter mix materials of our invention, the dry amylaceous material is agitated in any suitable container, and a stream of the oxidizing gas is passed through the agitated, dry mass for a period of from about 15 minutes to about 60 minutes. Again, the length of the reaction time will vary with the type of starch and the oxidizing agent used. After the reaction has been completed, the excess oxidizing gas is drawn out of the container, usually by flushing the latter with air. The oxidized amylaceous material is then usually screened or otherwise sifted and may be employed to prepare our novel batter mixes.

In the actual preparation of our batter mixes, the practitioner need merely prepare an aqueous slurry of the oxidized starch, the slurry containing about 75 parts, by weight, of starch per 100 parts of water. The precise starch:water ratio will depend, of course, upon the type of foodstuff being prepared, the manner in which the batter mix is to be applied, and the particular starch being utilized. The starch slurry is then kept under agitation prior to its application to the foodstuff so as to prevent the starch from settling. The batter mix may thereupon be applied to the foodstuff, which may be either fresh or frozen, by any convenient procedure such as dipping, spraying or cascading. After draining off the excess batter, the breading is applied and the foodstuff may then be deep-fried. It should be noted that it is unnecessary to heat the starch slurry prior to its application to the foodstuff. The practitioner may add such seasoning, seasoning extenders, preservatives, or food colors to the batter mix slurry as are desired, although, in most cases, such additives are not needed. The resulting breaded, deep-fried foodstuffs made with our batter mix are, in all cases, characterized by the golden-brown color and smooth, even texture of their breaded coatings which are always notably free from any crumbling or disintegration during their subsequent handling and eating.

In an alternative method, our batter mix starches may be applied to foodstuffs by means of a dusting procedure wherein the dry starch is directly applied to the surface of the foodstuff. The breading may also be applied by dusting and the foodstuff may then be deep-fried.

Our starch batter mix compositions may be prepared and used in the aforedescribed manner by manufacturers of deep-fried, frozen food products as well as by restaurants and housewives who may utilize it for the point-of-use deep-frying of all fresh and frozen foodstuffs. The starch batter mix compositions of our invention may thus be used in the preparation of all types of deep-fried fresh and frozen foodstuffs including fish, shell fish, poultry, meat and vegetable products including fish sticks, fish fillets, fish steaks, whole fish, scallops, oysters, clams, shrimps, lobster parts, chicken and turkey parts, veal, beef, pork, egg plant, and onion rings.

The following examples will further illustrate the embodiment of our invention. In these examples all parts given are by weight unless otherwise indicated.

*Example I*

This example illustrates the use of our starch batter mix in the preparation of pre-fried frozen fish which require further cooking prior to their ultimate consumption.

Frozen, raw, skinless cod fish fillets were cut into 3″ x 2″ x ½″ portions and dipped in an aqueous batter mix slurry which was being maintained, under agitation at 70° F. and which comprised a mixture of 100 parts treated for 30 minutes with .025% of ozone, as based on the weight of the corn starch.

After the excess batter mix had been drained off, the fish portions were thorougly coated with a bread crumb breading, lightly patted, and placed in a wire mesh frying basket. The breaded fish portions were next immersed in corn oil which was at a temperature of 385° F. and were then pre-fried for 45 seconds whereupon they were removed from the hot oil and allowed to drain. The pre-fried fish portions were then cooled in a refrigerator at approximately 40° F. for a period of one hour and were thereupon refrozen at 0° F. Samples of the frozen, pre-fried cod fish which had been stored for 7 days at 0° F. were then prepared for consumption by being baked for 18 minutes in an oven set at a temperature of 350° F. Additional samples were also prepared by baking for 11 minutes at a temperature of 450° F. After removal from the oven, both sets of the ready to eat samples were evaluated for general appearance and, more particularly, for the adhesion and cohesion characteristics of the breaded coatings. In both cases it was observed that the breaded coatings displayed a firm, pleasing texture along with a uniform, golden brown color. Moreover, they possessed an outstanding degree of adhesion to the fish so that removal of the breading could be accomplished only by removing a part of the fish. As for their cohesive properties, it was noted that these fish could be handled and eaten without any crumbling or disintegration on the part of the breaded coatings.

In contrast, when the above described procedure was repeated using, in this instance, an ordinary batter mix comprising 3.5 parts of water and 1.5 parts of a mixture containing 72.2% wheat flour, 19% non-fat milk solids, 2.5% dry egg white, 7% salt and 0.3% pepper, unsatisfactory results were obtained. Although the breaded coatings possessed a firm texture, they displayed very poor adhesion to the fish and could be stripped away with very little effort. Moreover, their cohesion was entirely negligible as was evidenced by their ready crumbling and disintegration upon handling and eating.

The latter results serve to point out the distinct superiority of our oxidized starch batter mixes with respect to their cohesive strength and their adhesion to foodstuffs.

*Example II*

This example illustrates the use of a number of different oxidizing gases in the preparation of various oxidized starch products for use in our novel batter mixes.

In preparing the oxidized starches used in this example, the dry starch or starch derivative was placed in a container and vigorously agitated. A stream of the oxidizing gas was then passed through the agitated mass of the dry material. After the desired amount of gas had been passed through the chamber, any excess gas was removed by flushing the latter with air. The oxidized product was passed through a screen and was then used to prepare a batter mix according to the procedure of Example I.

The following table sets forth the various amylaceous bases treated, the oxidizing agents used, the length of the reaction period, and the percentage of the oxidizing agent used, based on the weight of the starch base. In each case set forth in this example, the adhesion between the breading and the fish was such that removal of the breading was invariably accompanied by removal of a part of the fish.

| Starch base | Oxidizing gas | Reaction period | Percent of oxidizing gas (based on weight of starch base) |
|---|---|---|---|
| Corn starch | Chlorine | ½ hour | 0.04 |
| Do | Chlorine dioxide | ½ hour | 0.20 |
| Do | Ozone | 1 hour | 0.20 |
| Do | Nitrosyl chloride | ½ hour | 0.20 |
| Do | Nitrogen dioxide | ½ hour | 0.20 |
| Do | Ozone | ½ hour | 5.0 |
| Tapioca starch | Chlorine | ½ hour | 5.0 |
| Wheat starch | do | ½ hour | 0.04 |
| Potato starch | do | ½ hour | 0.04 |
| Tapioca starch | do | ½ hour | 0.04 |
| Waxy maize starch | do | ½ hour | 0.04 |
| Acetylated corn starch | do | ½ hour | 0.04 |
| Inhibited corn starch (prepared by treatment of corn starch with .05% by weight of epichlorohydrin according to Example III of U.S. Patent 2,500,950) | do | ½ hour | 0.04 |

*Example III*

This example illustrates the use of our oxidized starch batter mixes in the preparation of deep-fried scallops which were suitable for either immediate consumption or subsequent freezing.

Scallops which had been partially pre-cooked by boiling in water for 10 minutes were dipped into an aqueous batter mix slurry which was being maintained, under agitation, at 70° F. and which comprised a mixture of 210 parts of water and 90 parts of corn starch which had been treated for 30 minutes with 5.0% of chlorine, as based on the weight of the corn starch.

After the excess batter mix had been drained off from the pre-cooked scallops, they were thoroughly coated with a bread crumb breading, lightly patted, and placed in a wire mesh frying basket. The breaded scallops were next immersed in corn oil which was at a temperature of 385° F. and were then deep-fried for one minute whereupon they were removed from the hot oil and allowed to drain.

The ready to eat, deep-fried scallops were then evaluated for general appearance and textrue and, more particularly, for the adhesion and cohesion characteristics of their breaded coatings. It was observed that the breaded coatings possessed a pleasing, firm texture along with a uniform, golden-brown color. Moreover, they possessed an outstanding degree of adhesion to the scallops so that the removal of the breading could be accomplished only with the accompaniment of a portion of scallop. As for their cohesive properties, it was noted that these scallops could be handled and eaten without any crumbling or disintegration on the part of their breaded coatings.

Results comparable in all respects to those herein described were also obtained when this same batter mix preparation was used in the preparation of different deep-fried foods including breaded veal cutlets, breaded shrimp, southern fried chicken and breaded, fresh fried onion rings.

Any departure from the above description which conforms to the present invention is intended to be included within the scope of the invention as defined by the following claims.

We claim:

1. The process of preparing a breaded, deep fried foodstuff, which comprises passing an oxidizing gas through a dry mass of amylaceous material selected from the group consisting of starches for a period of time sufficient to produce a dry-oxidized amylaceous material, applying the said material to a foodstuff, applying a suitable breading to the thus coated foodstuff, and then cooking the foodstuff in a hot cooking oil.

2. The process of preparing a breaded, deep-fried foodstuff which comprises applying to said foodstuff a composition comprising an oxidized amylaceous material selected from the group consisting of oxidized starches, said amylaceous material being dry-oxidized by the passing of an oxidizing gas selected from the group consisting of ozone, chlorine, chlorine dioxide, nitrosyl chloride, and nitrogen dioxide through a dry mass of said amylaceous material, applying a suitable breading to the thus coated foodstuff, and then cooking the foodstuff in a hot cooking oil.

References Cited by the Examiner

UNITED STATES PATENTS

| 1,096,480 | 5/14 | Wesener | 99—232 |
| 1,519,014 | 12/24 | Watson et al. | |
| 2,472,590 | 6/49 | Kenyon et al. | 260—233.3 |
| 2,623,825 | 12/52 | Tressler et al. | 99—83 X |
| 3,052,545 | 9/62 | Ducharme et al. | 99—83 |

A. LOUIS MONACELL, *Primary Examiner.*

BEATRICE H. STRIZAK, *Examiner.*